United States Patent
Wintner et al.

(10) Patent No.: US 6,802,290 B1
(45) Date of Patent: Oct. 12, 2004

(54) APPARATUS FOR IGNITING A FUEL/AIR MIXTURE

(75) Inventors: Ernst Wintner, Oberweiden (AT); Ken-ichi Ueda, Tokyo (JP)

(73) Assignee: GE Jenbacher GmbH & Co OHG, Jenbach (AT)

( * ) Notice: Subject to any disclaimer, the term of this patent is extended or adjusted under 35 U.S.C. 154(b) by 0 days.

(21) Appl. No.: 10/679,970

(22) Filed: Oct. 6, 2003

Related U.S. Application Data

(63) Continuation of application No. PCT/AT02/00058, filed on Feb. 27, 2002, now abandoned.

(30) Foreign Application Priority Data

Apr. 5, 2001 (AT) .......................................... A 550/2001

(51) Int. Cl.[7] .............................................. F02P 23/04
(52) U.S. Cl. ........................................ 123/143 B; 431/1
(58) Field of Search .......................... 123/143 C, 169 R, 123/169 PA, 169 PH, 198 D, 198 DC, 143 R, 143 B; 174/5 R, 138 F; 439/125, 148; 60/39.821; 372/25; 431/1, 258

(56) References Cited

U.S. PATENT DOCUMENTS

| | | | | |
|---|---|---|---|---|
| 794,140 A | * | 7/1905 | Costa | 439/148 |
| 2,736,153 A | * | 2/1956 | Dunn | 123/146.5 R |
| 4,416,226 A | * | 11/1983 | Nishida et al. | 123/143 B |
| 4,852,529 A | * | 8/1989 | Vowles | 123/143 B |
| 4,947,640 A | * | 8/1990 | Few et al. | 123/143 B |
| 5,096,430 A | * | 3/1992 | D'Amico | 439/148 |
| 5,106,314 A | * | 4/1992 | Bael | 439/148 |
| 5,328,665 A | * | 7/1994 | Geiger | 123/143 B |
| 5,571,995 A | * | 11/1996 | Pierce | 439/148 |
| 5,673,550 A | | 10/1997 | Few et al. | 60/776 |
| 5,756,924 A | | 5/1998 | Early | 102/201 |
| 5,797,298 A | * | 8/1998 | Grevel | 439/148 |
| 5,824,948 A | * | 10/1998 | Berg | 174/5 R |
| 5,982,266 A | * | 11/1999 | Sanford et al. | 337/168 |
| 6,053,140 A | * | 4/2000 | Feichtinger et al. | 123/143 B |
| 6,302,682 B1 | * | 10/2001 | Early et al. | 431/1 |
| 6,382,957 B1 | * | 5/2002 | Early et al. | 431/1 |
| 6,676,402 B1 | * | 1/2004 | Early et al. | 431/1 |
| 2003/0156412 A1 | * | 8/2003 | Limber et al. | 362/249 |

FOREIGN PATENT DOCUMENTS

| | | |
|---|---|---|
| DE | 36 00 255 A1 | 7/1987 |
| DE | 44 05 769 A1 | 9/1995 |
| GB | 2 080 877 A | 2/1982 |
| JP | 59-023081 | 2/1984 |
| WO | WO 98/48221 | 10/1998 |

* cited by examiner

*Primary Examiner*—Tony M. Argenbright
(74) *Attorney, Agent, or Firm*—Lorusso Loud & Kelly LLP

(57) ABSTRACT

A device for igniting a fuel/air mixture in the combustion chamber of an internal combustion engine, particularly a stationary gas engine, with at least one light source, an optical transmission device and launching optics for focusing light into the combustion chamber. At least one master light source is provided for the continuous or periodic delivery of untriggered master light pulses, which themselves, are not capable of igniting. The optical transmission device has at least one amplifier, which can be selectively triggered and which amplifies individual or groups of master light pulses to an energy level that is sufficient for igniting the fuel/air mixture.

25 Claims, 2 Drawing Sheets

APPARATUS FOR IGNITING A FUEL/AIR MIXTURE

CROSS-REFERENCE TO RELATED APPLICATIONS

This is a continuation of International Application PCT/AT02/00058, with an international filing date of Feb. 27, 2002, now abandoned.

BACKGROUND OF THE INVENTION

The present invention relates to an apparatus for igniting a fuel/air mixture in the combustion chamber of a combustion engine, in particular a stationary gas engine, with at least one light source, an optical transmission apparatus and a coupling optic for focusing light into the combustion chamber.

Ignition apparatuses according to the preamble are known in the state of the art e.g. from DE 19911737 A1. Here, a laser beam guided in a light guide is coupled into the combustion chamber via a light element. Other approaches, such as e.g. U.S. Pat. No. 4,434,753 or U.S. Pat. No. 4,523,552, also provide that additives with high light absorption are additionally blown into the combustion chamber in the area of the supplied laser light. If these are struck by a triggered laser, they are heated. This leads to the ignition of the fuel/air mixture in the combustion chamber.

In the case of all laser ignition apparatuses, it is necessary in principle to provide by means of the laser the ignition energy required for ignition at the right time and in sufficient intensity. It is necessary to create an arrangement which withstands the permanent vibrations and the heat occurring around the combustion chamber. Furthermore, the manufacturing process of the ignition apparatus must be cost-favourable if it is to be used widely. These requirements are not, or only partly, fulfilled by the ignition apparatuses according to the preamble in the state of the art.

SUMMARY OF THE INVENTION

The object of the invention is therefore to create an apparatus according to the preamble in which the disadvantages of the state of the art are eliminated.

According to the invention, this is achieved in that at least one master light source is provided for the constant, preferably periodic, emission of untriggered, themselves non-flammable master light pulses and that the transmission apparatus includes at least one amplifier which is selectively triggerable and amplifies individual or groups of master light pulses to an energy level which is sufficient for igniting the fuel/air mixture.

It is therefore provided that master light pulses are produced constantly at a fixed frequency, guided via a transmission apparatus to the cylinder to be ignited in each case and introduced via a coupling optic into the combustion chamber of each cylinder. The energy of these master light pulses occurring constantly at fixed time intervals is alone not sufficient to ignite the fuel/air mixture. The ignition is triggered only by raising the energy level of individual master light pulses in a selectively triggerable amplifier, allocated to at least one cylinder, to the energy level necessary for ignition. This concept means that for several cylinders of an internal combustion engine, only one master light source is necessary, which emits light pulses at each ignition point of each cylinder via a suitable transmission apparatus. It is possible that all the cylinders of at least one combustion engine, and also that several amplifiers which are attached to a cylinder, are supplied with light pulses by at least one master light source. This means that the master light source can be arranged decentrally outside the vibration and heat area of the combustion engine.

A particularly favourable variant provides that the master light source is a laser. Favourable variants of these are constituted by the fact that the laser is a—preferably diode-pumped and/or passively Q-switched and/or actively Q-switched—solid-state laser. Among the solid-state lasers, Yb lasers and/or an Nd laser—preferably with Nd laser $Cr^{4+}$ saturable absorber—represent favourable possibilities. Furthermore, these variants provide that the Nd laser is housed in a suitable host material, preferably Nd:YAG. As alternative host material, e.g. YLF, Vanadat can also be used. Furthermore, variants provide that the master light source is in microdisk form.

In order to achieve the required precision in fixing the time of ignition, it is favourable that the master light source emits light pulses or laser pulses with a repetition frequency of 1 to 25 kHz—preferably of 5 kHz. With regard to the pulse duration, it is favourable that the master light source emits light pulses or laser pulses with a pulse duration of 1 ns to 500 ns—preferably 100 ns to 300 ns (nanoseconds). With regard to the wavelength of the light emitted by the master light source, it is favourable that the wavelength of the light used is between 0.5 $\mu$m (micrometres) and 20 $\mu$m, preferably between 0.5 $\mu$m and 5 $\mu$m.

Favourable variants firstly provide that at least one amplifier of the transmission apparatus includes at least one light-amplifying—preferably laser-active—light guide—preferably a flexible optical fibre. Secondly, favourable variants provide that at least one amplifier of the transmission apparatus includes at least one light-amplifying, preferably laser-active monolithic rod and/or at least one light-amplifying, preferably laser-active crystal wafer. In the case of both variants, it is provided according to the invention that the master light source is fixedly connected by glass fibre to several amplifiers, each allocated to at least one cylinder. In these amplifiers, there is accordingly triggered, within a defined time interval in the light-amplifying or laser-active medium, a quantity of energy which amplifies the next occurring master light pulse in energy-creating manner in such a way that an ignition of the fuel/air mixture is triggered in the combustion chamber of the cylinder allocated to the respective amplifier. The time of ignition is fixed by the triggering of the amplifier. As a result of this arrangement, the heat- and vibration-prone master light source can be arranged in a decentral location, while its pulses and the transported power can be distributed via single-mode fibers and/or thin multi-mode fibers. The master light source can thereby be decoupled from the cylinder mechanically (with regard to vibration and temperature), while the much more robust amplifiers (e.g. monolithic rod or crystal wafer) are seated against the cylinder.

In addition, it is particularly favourable that at least one amplifier amplifies the energy level of the light or laser pulses to 0.5 mJ (millijoules) to 10 mJ—preferably 1 mJ to 5 mJ.

In the case of the use of a light-amplifying and/or laser-active, preferably flexible, optical fibre as an amplifier, it is particularly favourable that this has a section that is wound up, preferably in a coil shape. As a result the length, required for amplification, of the light-amplifying preferably flexible optical fibre can be fitted into a space which is small overall.

Favourable variants provide that at least one triggerable pump light source acting on at least one light-amplifying, preferably laser-active light guide and/or at least one light-amplifying preferably laser-active monolithic rod and/or at least one light-amplifying preferably laser-active crystal wafer is provided. The pump light source can be coupled longitudinally or transversally preferably via glass fibers to the light-amplifying or laser-active material.

Favourable versions provide that the pump light source is a semiconductor laser. Thus, e.g. quasi cw laser diodes with 800 nm wavelength can be used for Nd. Triggering takes place in these versions as required for each individual cylinder via the power supply e.g. of the quasi cw laser diodes, the emission duration of which is preferably between 150 and 200 ms.

BRIEF DESCRIPTION OF THE SEVERAL VIEWS OF THE DRAWING

Further features and details of the present invention result from the following description of the figures. There are shown in.

DETAILED DESCRIPTION OF THE INVENTION

Figure 1:
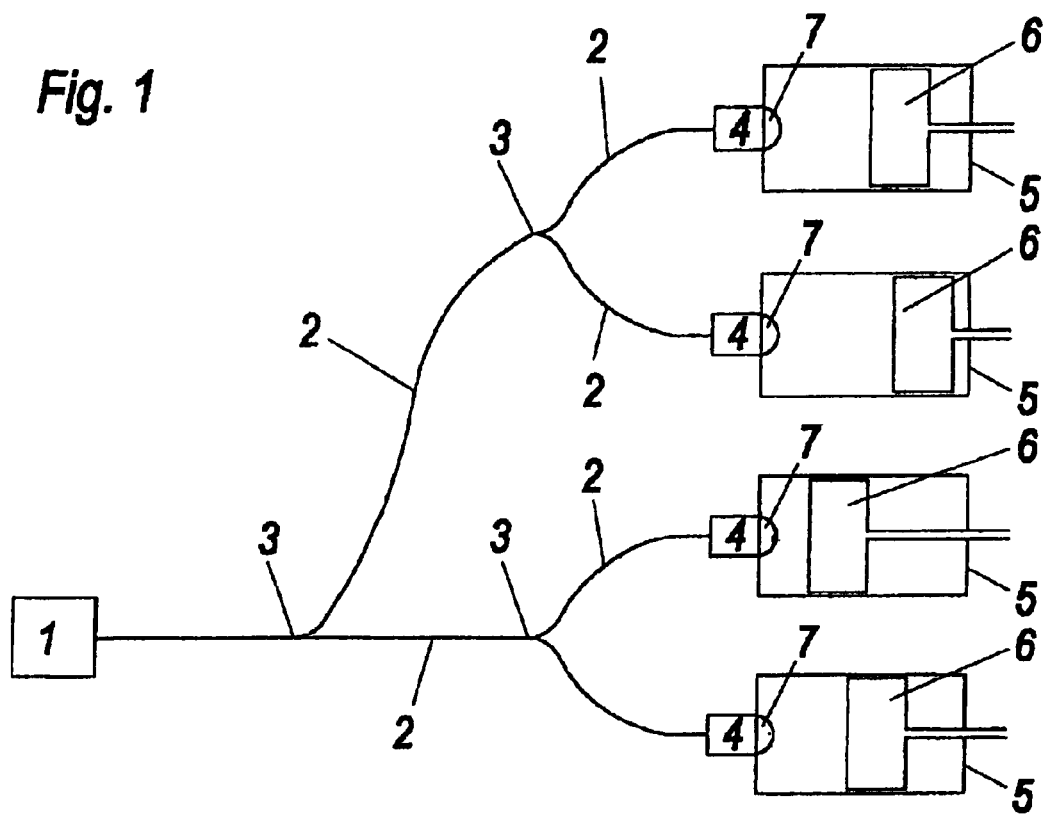
FIG. 1 a schematic representation of an arrangement comprising master light source, transmission apparatus and cylinders, FIG. 2 a view of a detail of the arrangement of an amplifier on a cylinder, FIG. 3 a schematic representation of the chronology and superimposition of the energy of master light pulse and pump radiation of the amplifier and FIG. 4 a schematic representation of the version of an amplifier as a light-amplifying or laser-active optical fibre, preferably wound up in a coil shape.

A spatial distribution diagram of the glass-fibre connection is schematically represented in FIG. 1. The master light source 1 feeds light pulses 8 into the system of glass-fibre connections 2 in a free-running manner. It is e.g. provided that the light or laser pulses 8 are emitted from the master light source 1 at a clock frequency of e.g. 5 kHz. The light pulses 8 pass through the transmission apparatus which consists of the glass fibers 2 and their branches (couplers) 3 and pass predominantly unamplified through the amplifiers 4 and the coupling optic 7 into the respective cylinders 5. If the master light pulses 8 enter the cylinders 5 unamplified, their energy is not sufficient to ignite any fuel/air mixture currently present in the combustion chamber 14 of the cylinder 5. Misfires are hereby avoided.

Figure 2:
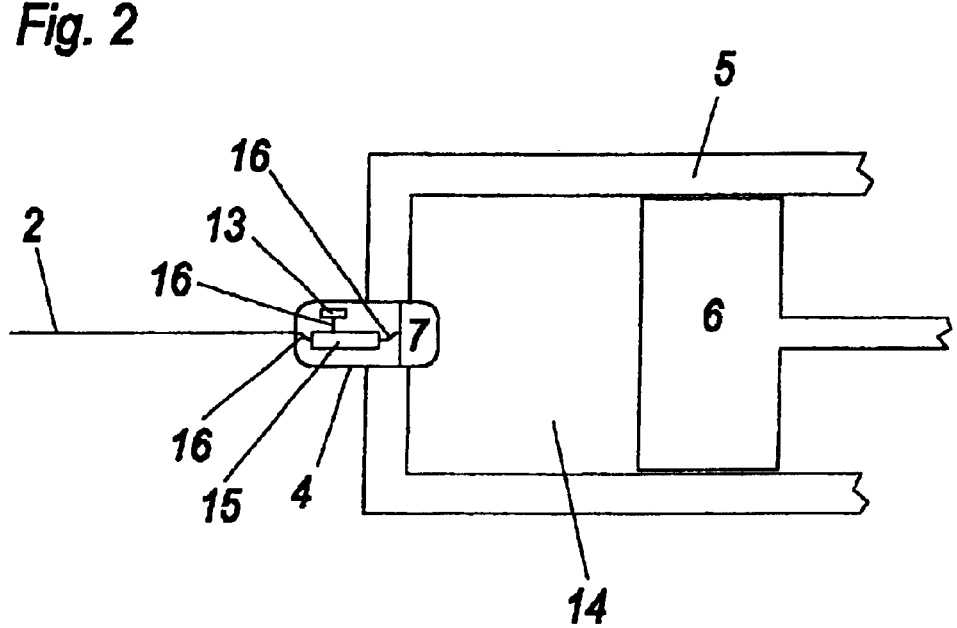

FIG. 2 shows a representation of a detail of the cylinder 5 with piston 6. In the cylinder 5, an amplifier 4 is attached to the coupling optic 7 in such a way that the laser pulses emerging from the amplifier 4 enter the combustion chamber 14 of the cylinder 5 through the coupling optic 7. The amplifier 4 preferably has a light-amplifying or laser-active material 15 e.g. a monolithic rod or crystal wafer. The laser-active material of the amplifier 4 is pumped longitudinally or transversally (represented here) by a pump light source 13 (e.g. by a quasi cw laser diode with approx. 800 $\mu$m for Nd). The amplifier is triggered via the power supply (not represented here) of the pump light source 13 (here quasi cw laser diode). The typical emission duration of quasi cw laser diodes is between 150 and 200 ms. Favourably, the laser-active material 15 is connected to the coupling optic 7, the glass fibre 2 and/or the pump light source 13 via glass fibers 16.

Figure 3:
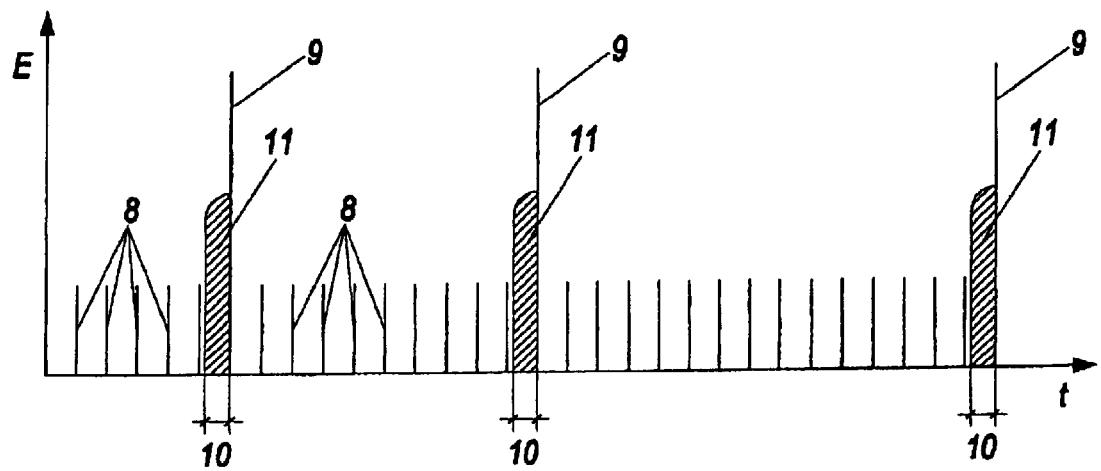

The type of amplification of the master light pulse by the light-amplifying or laser-active material 15 in the amplifier 4 is explained with reference to FIG. 3. FIG. 3 shows a diagram in which the energy E of the light or laser pulses introduced via the coupling optic 7 into the combustion chamber 14 of different cylinders 5 is plotted against the time t. The chronology can be described as follows, as illustrated by FIG. 3:

At a preferable frequency of 5 kHz, the master light pulses 8 pass through the transmission apparatus, which consists of the glass fibers 2 and the branches (couplers) 3, to the amplifiers 4 and through these and their coupling optics 7, almost always unamplified into the cylinders, where they do not bring about any ignition in their unamplified form. If during the time interval 10 the light-amplifying or laser-active material 15 of an amplifier 4 is pumped with the right lead time of up to 200 ms, the next master light pulse 8 undergoes suitable amplification by the pumped energy 11, so that thereby an overall ignition pulse 9 is formed which leads to the ignition of the fuel/air mixture compressed in the combustion chamber 14. The pumping and thus the ignition pulse 9 are therefore triggered via the power feed (not represented here) of the pump source 13. In other words, a flammable light or laser pulse 9 is created for a cylinder only if, during the time interval 10, sufficient energy between two master light pulses 8 is provided in the light-amplifying or laser-active material 15 of the amplifier 4 by pumping. If sufficient energy 11 is available in the light-amplifying or laser-active material 15, the next master light pulse 8 is amplified into an ignition pulse 9. The required accuracy in fixing the time of ignition (firing angle) is approx. 0.2 ms (milliseconds) to 1 ms, preferably approx. 0.5 ms. The times of ignition for the occurrence of the ignition pulses 9 (firing angle) of the individual cylinders are not chronologically equally distributed as represented in FIG. 3. A sufficiently fine chronological distribution of possible times of ignition for an unequal chronological distribution of the times of ignition of individual cylinders is guaranteed by a sufficiently high repetition frequency (here 5 kHz) of the master light pulses 8. The beam quality is determined by the master light source and transmission apparatus consisting of glass-fibre line 2 and branches 3. The amplifier 4 scarcely influences the beam quality, which helps safeguard against destruction.

Figure 4:
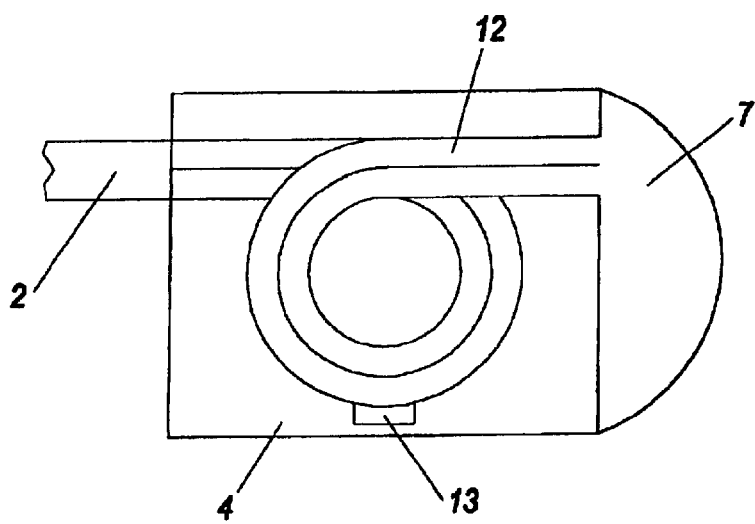

FIG. 4 shows an alternative design of the amplifiers 4. Here, the light-amplifying or laser-active material is developed as a preferably flexible, light-amplifying or laser-active optical fibre—preferably wound up in a coil shape. This wound optical fibre 12 is in turn pumped by a pump source 13. In turn, the amplifier 4 is triggered and therefore the ignition pulses 9 are developed by the power supply of the pump source 13. Also in the case of the design according to FIG. 4, the applied basic principle of the time-triggered amplification of master light pulses 8 corresponds to the diagram represented in FIG. 3.

What is claimed is:

1. Apparatus for igniting a fuel/air mixture in a combustion chamber of a combustion engine with at least one light source, an optical transmission apparatus and a coupling optic for focusing light into said combustion chamber, wherein at least one master light source is provided for the constant emission of untriggered, themselves non-flammable master light pulses and wherein said transmission apparatus includes at least one amplifier which is selectively triggerable and amplifies individual or groups of master light pulses to an energy level which is sufficient to ignite said fuel/air mixture.

2. Apparatus according to claim 1, wherein said master light source is provided for the constant periodic emission of untriggered, themselves non-flammable master light pulses.

3. Apparatus according to claim 1, wherein said combustion engine is a stationary gas engine.

4. Apparatus according to claim 1, wherein said master light source is a laser.

5. Apparatus according to claim 4, wherein said laser is a solid-state laser.

6. Apparatus according to claim 5, wherein said solid-state laser is diode-pumped or passively Q-switched or actively Q-switched.

7. Apparatus according to claim 5, wherein said solid-state laser is a Yb laser or Nd laser.

8. Apparatus according to claim 7, wherein said Nd laser is an Nd laser with $Cr^{4+}$ saturable absorber.

9. Apparatus according to claim 1, wherein said master light source emits light pulses or laser pulses with a repetition frequency of 1 to 25 kHz.

10. Apparatus according to claim 9, wherein said repetition frequency is 5 kHz.

11. Apparatus according to claim 1, wherein said master light source emits light pulses or laser pulses with a pulse duration of 1 ns to 500 ns.

12. Apparatus according to claim 1, wherein said master light source emits light pulses or laser pulses with a pulse duration of 100 ns to 300 ns.

13. Apparatus according to claim 1, wherein the wavelength of said light used is between 0.5 µm and 20 µm.

14. Apparatus according to claim 1, wherein the wavelength of said light used is between 0.5 µm and 5 µm.

15. Apparatus according to claim 1, wherein at least one amplifier of said transmission apparatus includes at least one light-amplifying light guide or at least one monolithic rod or at least one light-amplifying crystal wafer.

16. Apparatus according to claim 15, wherein said light guide or said monolithic rod or said crystal wafer is laser active.

17. Apparatus according to claim 15 wherein said light guide is a flexible optical fibre.

18. Apparatus according to claim 15, wherein said amplifier amplifies the energy level of said light or laser pulses to 0.5 mJ to 10 mJ.

19. Apparatus according to claim 15, wherein said amplifier amplifies the energy level of said light or laser pulses to 1 mJ to 5 mJ.

20. Apparatus according to claim 15, wherein in the case of a light-amplifying or laser-active optical fibre, this has a section that is wound up.

21. Apparatus according to claim 20, wherein said optical fibre has a section wound up in a coil shape.

22. Apparatus according to claim 15, wherein at least one triggerable pump light source acting on at least one light-amplifying light guide or at least one light-amplifying monolithic rod or at least one light-amplifying crystal wafer is provided.

23. Apparatus according to claim 22, wherein said light guide or said monolithic rod or said crystal wafer is laser active.

24. Apparatus according to claim 1, wherein said pump light source is a semiconductor laser.

25. Apparatus for a multi-cylinder combustion engine according to claim 1, wherein for several cylinders, only one common master light source is provided in each case and said optical transmission apparatus has one or more branches in order to distribute said master light to cylinder-selective, triggerable amplifiers.

* * * * *